(12) United States Patent
Shemer et al.

(10) Patent No.: US 10,620,851 B1
(45) Date of Patent: Apr. 14, 2020

(54) DYNAMIC MEMORY BUFFERING USING CONTAINERS

(71) Applicant: EMC IP Holding Company LLC, Hopkinton, MA (US)

(72) Inventors: Jehuda Shemer, Kfar Saba (IL); Assaf Natanzon, Tel Aviv (IL); Ran Goldschmidt, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 176 days.

(21) Appl. No.: 15/727,427

(22) Filed: Oct. 6, 2017

(51) Int. Cl.
*G06F 3/06* (2006.01)
*G06F 16/11* (2019.01)
*G06F 16/16* (2019.01)

(52) U.S. Cl.
CPC .......... *G06F 3/0619* (2013.01); *G06F 3/065* (2013.01); *G06F 3/067* (2013.01); *G06F 3/0631* (2013.01); *G06F 16/122* (2019.01); *G06F 16/128* (2019.01); *G06F 16/164* (2019.01)

(58) Field of Classification Search
CPC ...... G06F 3/0619; G06F 3/0631; G06F 3/065; G06F 3/067; G06F 16/122; G06F 16/128; G06F 16/164
See application file for complete search history.

(56) References Cited

U.S. PATENT DOCUMENTS

| | | | | |
|---|---|---|---|---|
| 5,465,331 | A | * 11/1995 | Yang | H04L 12/46 370/412 |
| 6,928,526 | B1 | * 8/2005 | Zhu | G06F 3/0608 711/118 |
| 2007/0100917 | A1 | * 5/2007 | Amano | G06F 11/1435 |

* cited by examiner

*Primary Examiner* — Larry T Mackall
(74) *Attorney, Agent, or Firm* — Womble Bond Dickinson (US) LLP

(57) ABSTRACT

Dynamic memory allocation is provided using containers and overlay snaps. A first container is generated to receive a first data stream, and an associated overlay snap is generated to which the data of the first container is transmitted. In response to a storage capacity of the first container reaching a threshold, a second container is generated to receive a second data stream. A second overlay snap associated with the second container is generated, and data of the second container is transmitted to the second overlay snap.

21 Claims, 10 Drawing Sheets

DYNAMIC MEMORY BUFFERING USING CONTAINERS

FIELD OF THE INVENTION

Embodiments of the present invention relate generally to data storage systems.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection. In continuous replication systems, a journal (usually a volume) is used to store write information before distributing to a remote volume.

BRIEF DESCRIPTION OF THE DRAWINGS

The aspects herein are illustrated by way of example and not limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
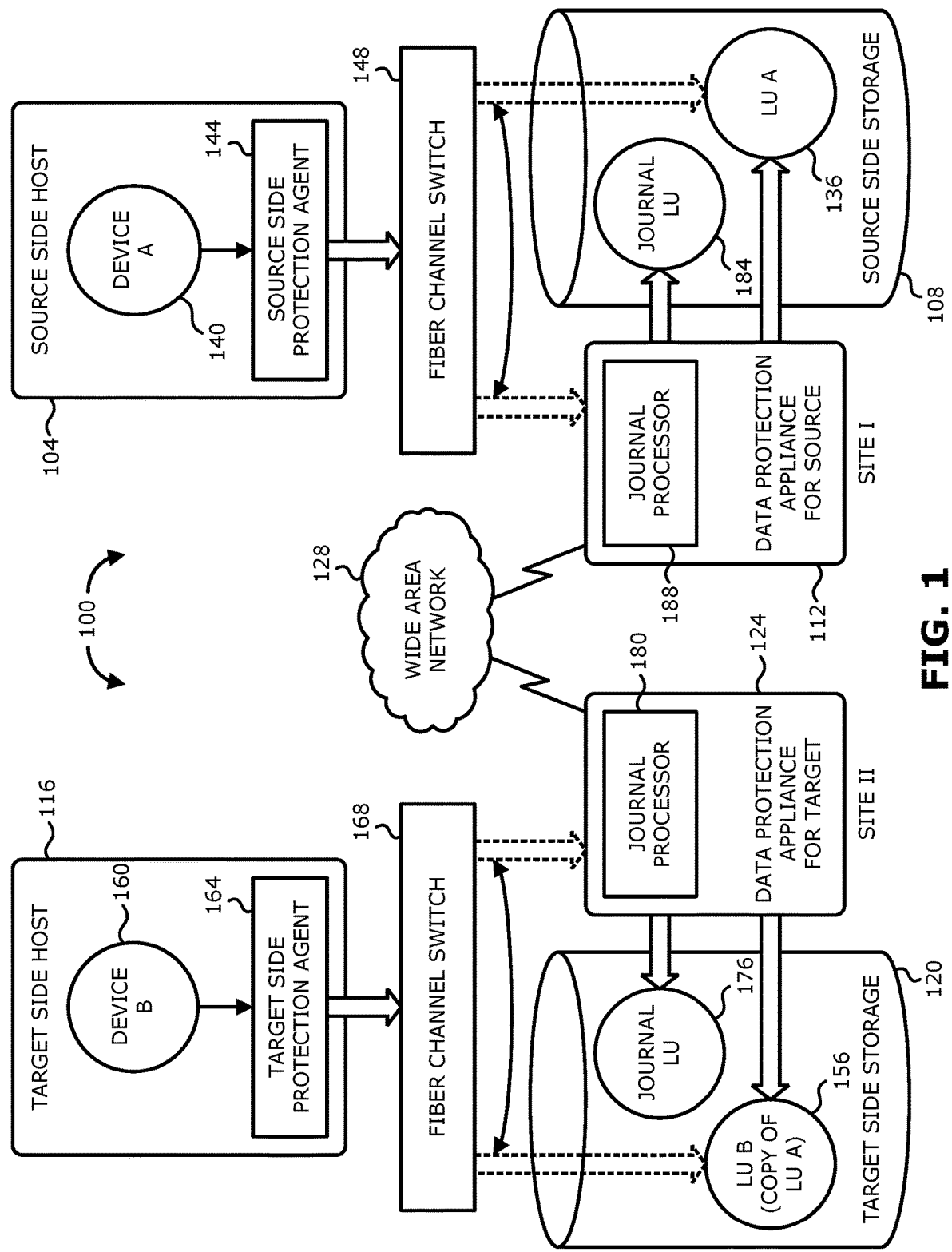
FIG. 1 is a simplified block diagram for explaining a data protection system according to an embodiment.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

The following definitions may be useful in understanding the following description:

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

In continuous replication systems, a journal typically has the following purposes: (i) store write history to allow for recovery of multiple points in time; and (ii) during an initial full sweep (or other initialization flows), keep write order fidelity of continuous data streams (e.g., input/output (IO) streams) and data from synchronization. In this regard, storage systems often have a mechanism to store multiple points in time, for example, in the form of storage snapshots or clones, among others techniques. However, conventional storage systems typically do not have mechanisms to allow for write synchronization, other than trivial locking synchronization between parallel writes. Therefore, if multiple streams of unordered data reach the storage at the same time, write order fidelity may not be kept and consistency may be compromised. To address this, one conventional approach uses journals to store data streams separately in different parts of the journal. Conventionally this is done external to the storage system using additional volumes like the journal volumes. The data streams are then merged in the correct order after substantially all of the streams (except maybe at most one stream) receive all their data. The merge itself should happen in a correct order so writes that came in later in the data streams will be reflected correctly after the merge.

One embodiment described herein provides for a new storage mechanism, referred to herein as an overlay snap, to allow write order fidelity synchronization of multiple input streams to a target storage.

Another issue that typically must be addressed by data processing systems such as continuous replication systems is high extremities of data influx. Sporadic high levels of writes often cause systems to overload or may disrupt replication. Conventional systems often keep large amounts of pre-allocated spare memory to server as buffers and store these writes until they can be transmitted to the replica location. This schema has a few drawbacks. For example, according to this conventional approach, in situations where the system is not overloaded with an influx of data, a large amount of memory is still allocated and is idle. In addition, the memory sizing is typically built to withstand a particular volume of data. If the incoming data rate supersedes the outgoing data rate, memory will often fill up (i.e., the memory will become full such that storage is no longer available) and will block storage at some point. Therefore, conventional system often need to be given enough memory to withstand local peak traffic but low enough to not use a lot of system resources when not at peak.

Dynamically allocating memory resources is difficult and not trivial, particularly since allocation of resources is typically spread across appliances/containers/other computing devices, and after the memory is allocated and filled, the multiple locations need to be transmitted and merged while keeping write order fidelity. This task is not simple even with one source buffer, and is very complicated when multiple memory buffers are involved. This issue is particularly apparent for application storage caches that write to a backend storage device, and for continuous replication systems where data is sent over a slower communication link (e.g., IP), where outgoing data may be slower (at least momentarily) than incoming data.

Figure 2:
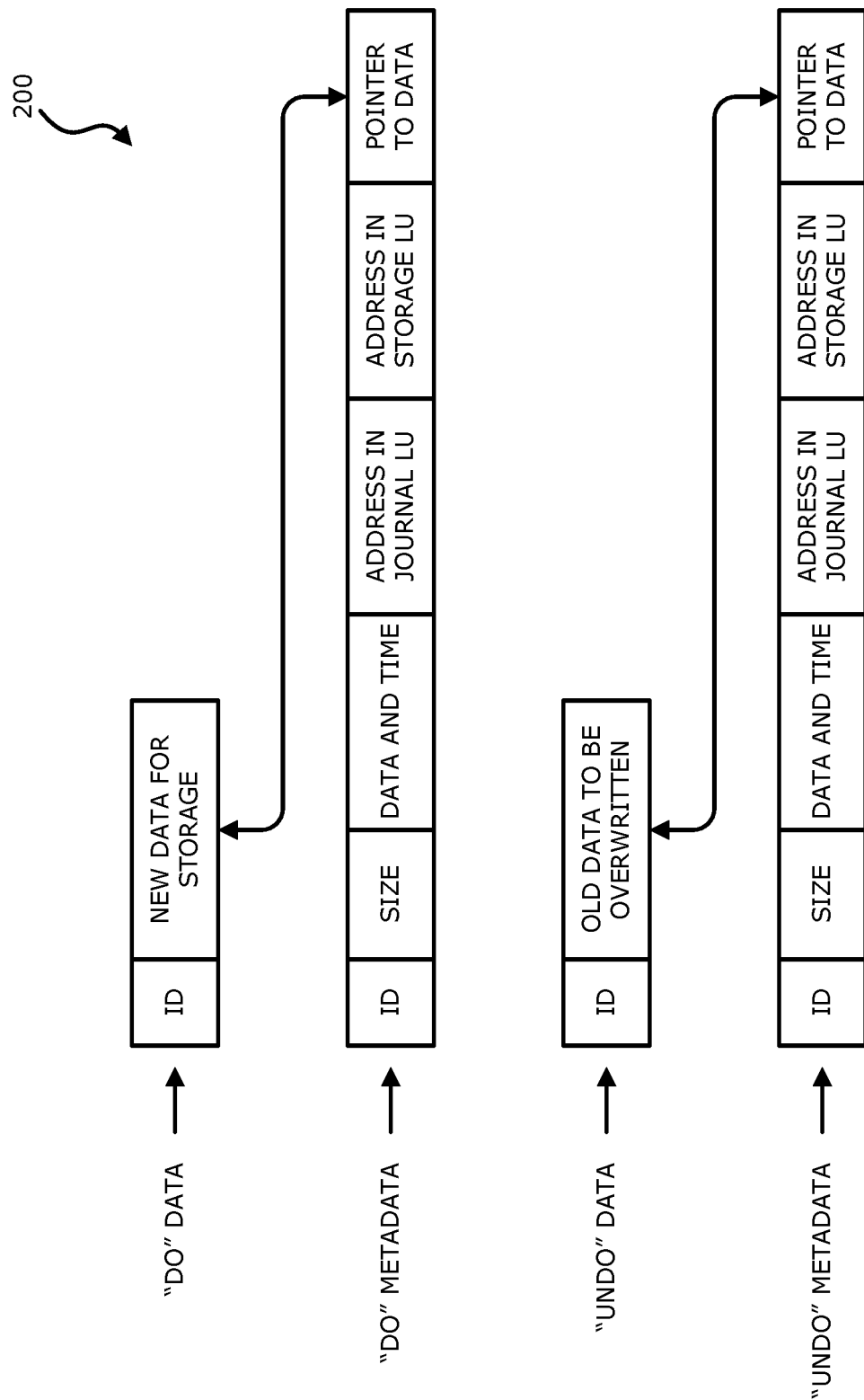
FIG. 2 is a simplified illustration for explaining a journal history of write transactions for a storage system according to an embodiment.

An Example of a Replication System Used with a Continuous Replication Mode (FIGS. 1 and 2)

Referring to FIG. 1, a data protection system 100 includes two sites; Site I, which is a production site, and Site II, which is a backup site or replica. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein below, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA. After the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. After receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

In some embodiments, a snapshot is taken immediately before a replication starts. The snapshot records information of the file system or the block device at a point in time. The snapshot may therefore be considered a point in time copy of a volume or in other words a frozen copy of a volume at a point in time. It may be a snapshot of the entire file system or the entire block device, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated. It is therefore possible to generate a snapshot and a list of differences (e.g., data that has been written since the snapshot was generated). There are various ways to implement a snapshot, including "copy and write" approaches and "redirect and write" approaches.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Reference is now made to FIG. 2, which is a simplified illustration of a write transaction 200 for a journal. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice, each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

Figure 3A:
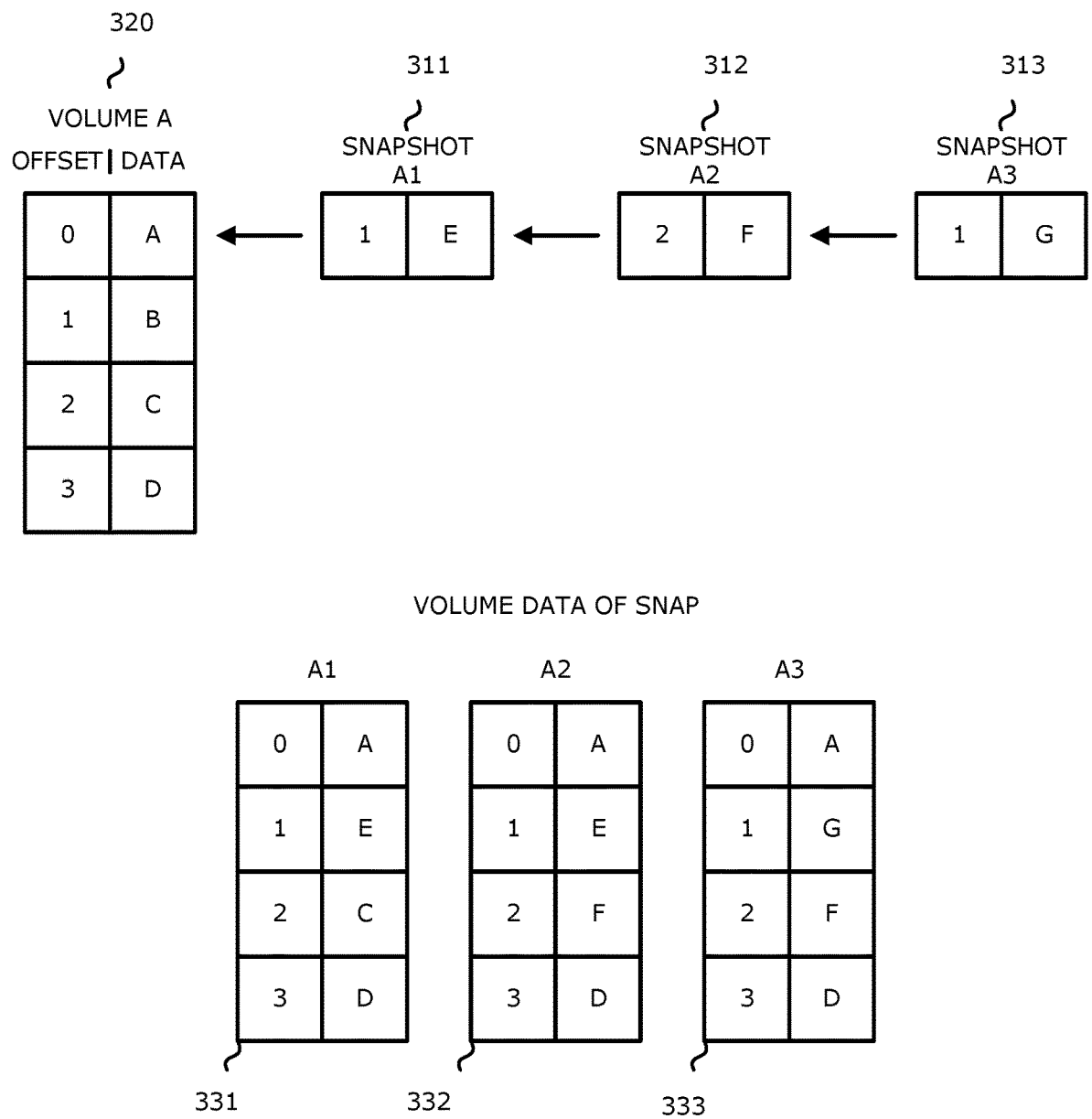
FIG. 3A is a representation for explaining snapshots.

Turning to FIG. 3A, three example snapshots are shown, namely snapshots 311, 312 and 313, along with an example volume 320.

In the example of FIG. 3A, snapshots 311, 312 and 313 may be conventional snapshots which are associated with the volume 320. For example, when a first snapshot is taken of volume 320, data is written to snapshot 311. When a second snapshot is taken of volume 320, data may be written to snapshot 312. When a third snapshot is taken of volume 320, data may be written to snapshot 313. When a new snapshot is taken, the previous volume is frozen and new data is written to the new snapshot which assumes the volume identity.

The volume data of the snapshot is a view of the data when accessing this point in time. In the example of FIG. 3A, volume data 331 is a view of the data when accessing volume A at the point in time of snapshot A1, volume data 332 is a view of the data when accessing volume A at the point in time of snapshot A2, and volume data 333 is a view of the data when accessing volume A at the point in time of snapshot A3.

Conventional snapshots typically have the following traits in order to keep a consistent point in time: (1) when writes arrive to the underlying volume, the previous version of the data is kept (e.g., by either copy-on-write or pointer manipulation) so the data from the snapshot perspective is unchanged; and (2) when writes arrive to the snapshot (if the snapshot is mounted as a writable snap) they are added to the snapshot data and will supersede data in the underlying volume.

Figure 3B:
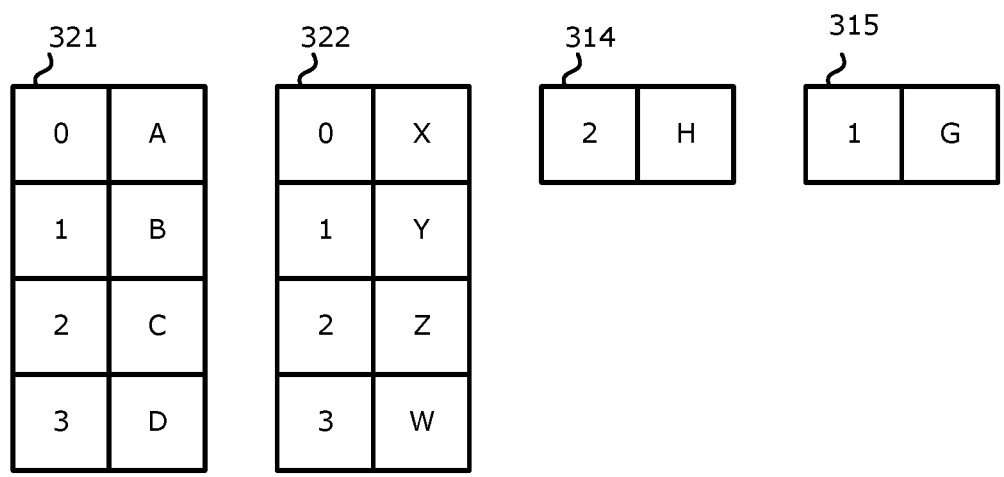
FIG. 3B is a representation for explaining an overlay snap according to an embodiment.

Turning to FIG. 3B, two example overlay snaps are shown, namely overlay snaps 314 and 315, along with two example volumes 321 and 322. In one embodiment, volumes may be point in time copies. In one embodiment, an overlay snap is a storage mechanism structured similarly to a conventional snapshot. However, in contrast to snapshots 311, 312 and 313, overlay snaps 314 and 315 do not keep the previous version of the data when writes arrive to the underlying volume. In one embodiment, writes to the underlying volume are written to it as if the snapshot does not exist. Writes to the overlay snap will be stored in the overlay snap without affecting the volume.

In one embodiment, an overlay snap may be generated by generating a snapshot of a logical volume. In one embodiment, the logical volume may be a virtual volume, e.g., an imaginary volume that does not exist. In one embodiment, the logical embodiment may be an empty volume). The overlay snap may have a data stream written to it, with information (e.g., pointers) indicating locations of new data (e.g., locations of changes in data) and null information for unwritten locations. Null information may include, for example, pointers pointing to nowhere (e.g., null pointers). By way of background, a conventional snapshot typically includes a set of pointers that point to new data, and the remaining pointers point to locations that have not changed (e.g., do not have new data written to them) and point to locations in the snapshot.

Figure 3C:
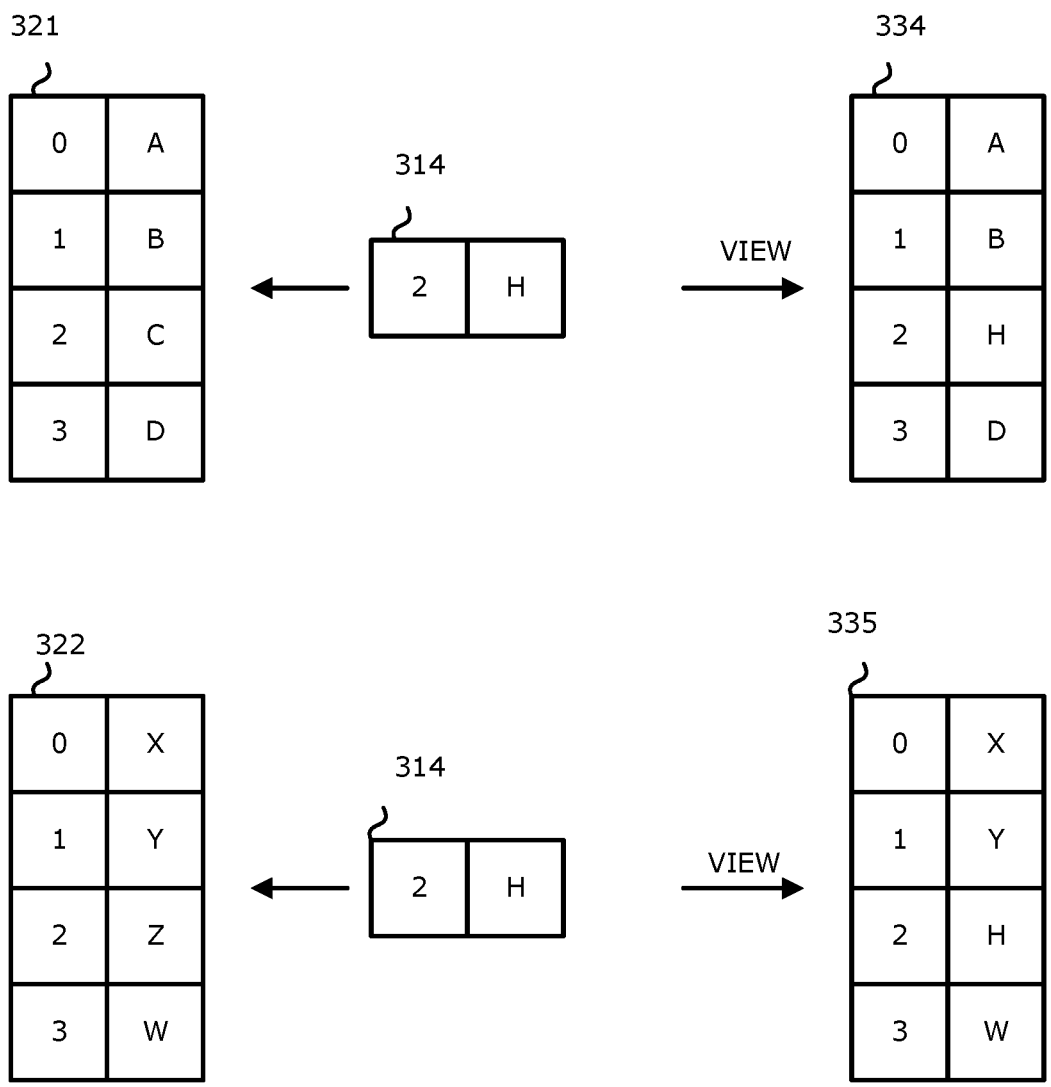
FIG. 3C is a representation for explaining overlay snaps attached to volumes according to an embodiment.

In contrast to a conventional snapshot, an overlay snap is not associated with a point in time. In one embodiment, the overlay snap does not fix the point in time on data streams (IOs) that did not target the overlay snap. In that sense, an overlay snap may be considered a transparent stencil of data that is above its underlying volume. Thus, an overlay snap includes changes from the incoming data stream and can be overlaid on any volume data. An overlay snap therefore is not necessarily associated with a particular volume. For example, overlay snap 314 may be applied to volume 321 such that the data included in overlay snap 314 is written to volume 321, and overlay snap 314 may also be applied to volume 322 such that the data included in overlay snap 314 is written to volume 322. Similarly, overlay snap 315 may be applied to volume 321 and may also be applied to volume 322. FIG. 3C illustrates examples of applying an overlay snap to a volume. In particular, in the example of FIG. 3C, overlay snap 314 is applied to volume 321 to generate a new volume 334, and overlay snap 314 is applied to volume 322 to generate new volume 335. Thus, new volumes 334 and 335 may be considered point in time copies. It is therefore possible to enable rollback of the backup storage to previous points in time by attaching an overlay snap to a volume (disk). In the case that an overlay snap is attached to a volume, a new volume is generated that can be considered a frozen disk.

Figure 3D:
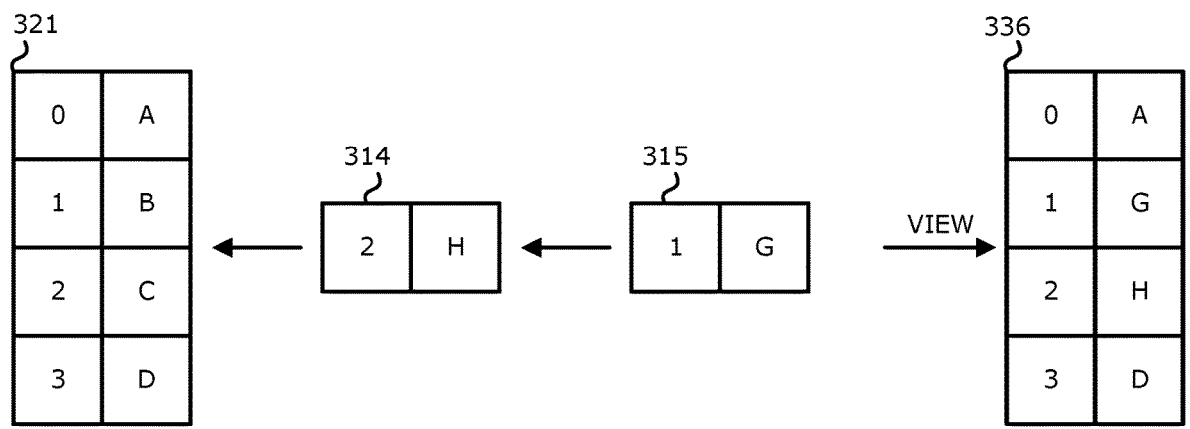
FIG. 3D is a representation for explaining attachment of multiple overlay snaps to a volume according to an embodiment.

In one embodiment, any number of overlay snaps may be generated, for example, one for each incoming data stream. As shown in FIG. 3D, multiple overlay snaps may be applied. For example, an overlay snap (e.g., 315) may be applied over another overlay snap (e.g., 314) and the result may be applied to a volume (e.g., 321) to generate a new volume (e.g., 336).

Figure 4:
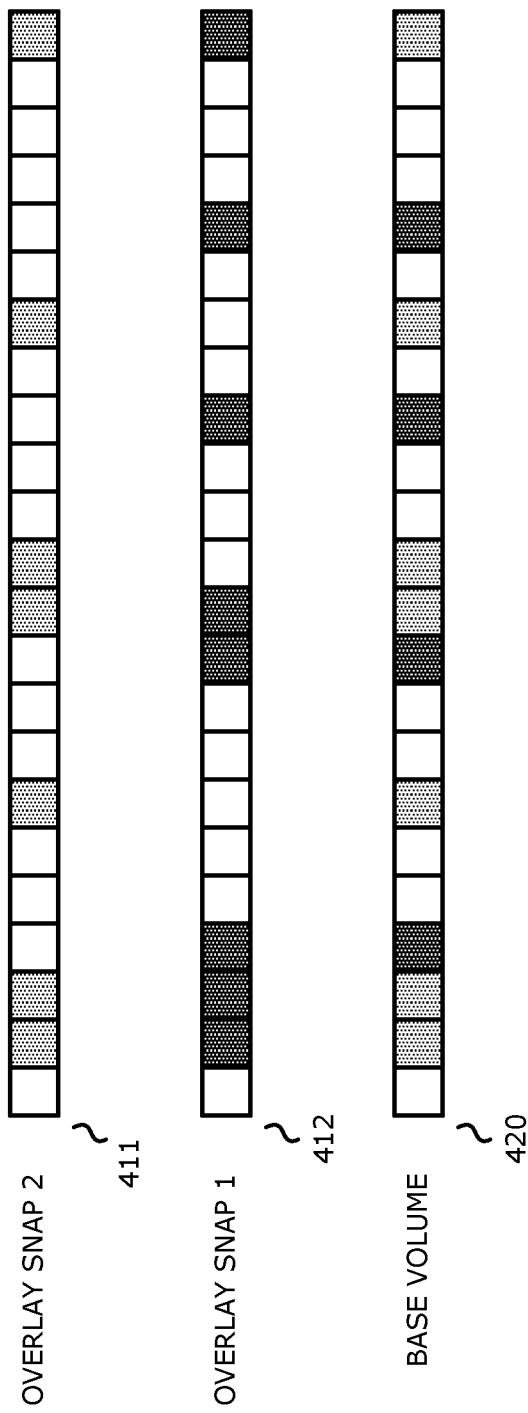
FIG. 4 is another representation for explaining attachment of multiple overlay snaps to a volume according to an embodiment.

FIG. 4 illustrates a different example of applying multiple overlay snaps (e.g., 411, 412) to volume 420. As shown in FIG. 4., when overlay snaps 411 and 412 are applied to volume 420, the data included in the overlay snaps 411 and 412 is written to the volume 420.

In one embodiment, an overlay snap may be attached to another overlay snap. When these overlay snaps are attached to a volume, in one embodiment, a list of overlap snaps is also generated and attached.

In one aspect, when data streams are received from multiple sources, each stream may be stored in a different overlay snap, creating layers of data that may be applied over a volume.

In one aspect, overlay snaps may be used to synchronize writes from different storage sources. For example, if there are data streams from multiple sources, each stream may be stored in a different overlap snap (layer). Each overlay snap separately maintains its own write order fidelity, such that when the overlay snaps are layered over each other the data streams (IOs) will maintain write order fidelity (e.g., will not change order). Accordingly, when an overlay snap is applied to a volume, and particularly when multiple overlay snaps are applied, write order fidelity is maintained. Use of overlay snaps therefore make it possible to have write order fidelity synchronization of multiple input streams to a target. In contrast, this is conventionally accomplished external to the storage system using additional volumes such as journal volumes.

Figure 5:
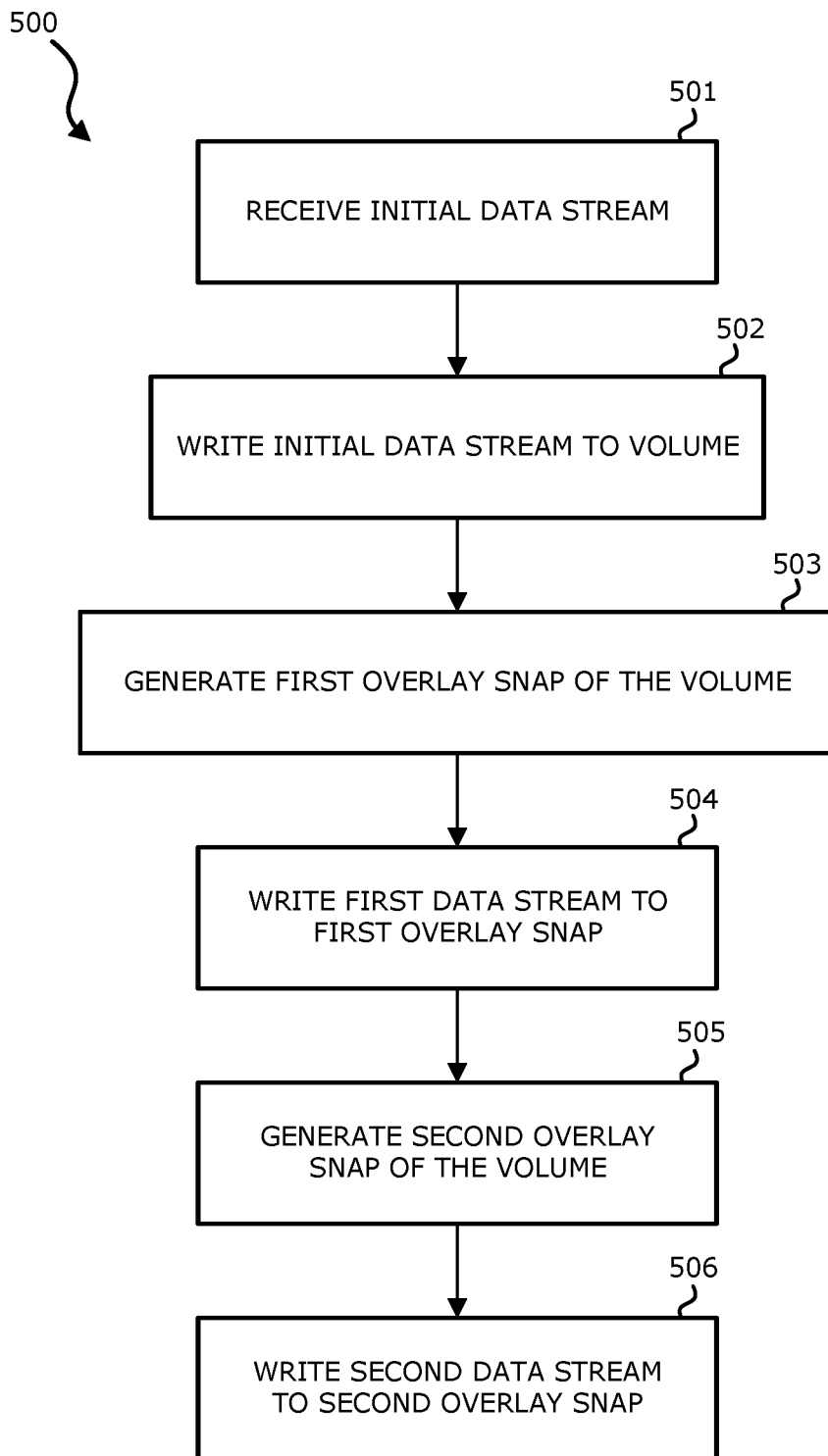
FIG. 5 is a flow chart for explaining a method of using an overlay snap with a continuation data replication system to maintain write order fidelity according to an embodiment.

FIG. 5 is a flow diagram illustrating a process of using overlay snaps to synchronize streams of data while maintaining write order fidelity according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by 602 of FIG. 6. Generally, the processes described in connection with FIG. 5 use an overlay snap to synchronize data replication while new writes are continuously being sent.

Process 500 addresses a situation where an initial sweep of the volume occurs or otherwise known parts of the volume need to be synchronized while keeping write order fidelity. In one aspect, two data streams are considered, namely an initial data stream ("init data") and a new data stream that may be continuous. At block 501, the initial data stream may be retrieved either by reading directly from a source volume, or by taking a conventional snapshot of the source volume (e.g., primary storage) and performing a sweep on the snapshot. The advantage of the latter approach is that the sweep is for a consistent point in time, but should not affect the final consistency of the process.

At block 502, the initial data stream is sent directly to a target volume. In one embodiment, data is read from the conventional snapshot generated at block 501 and written to a volume on the target side (e.g., replica side). Thus, a copy of the snapshot may be generated on the target side.

At block 503, a first overlay snap of the volume is generated. In one embodiment, the first overlay snap is generated by the target side (e.g., replica side). When the overlay snap is generated, it is empty. The overlay snap will stay empty way when writes are done to the underlying volume. The overlay snapshot is generated before the snapshot of the primary (source) volume is created and thus the data of the primary volume point in time+the overlay snap describes the time of the latest data stream (T0) received by the overlay snapshot.

At block 504, a first data stream is written to the first overlay snap. The first data stream may be continuous. Write order fidelity is kept for this stream of data within itself. In one embodiment, additional new data streams will arrive and be written in the order they come in, with new data streams overwriting old ones.

At block 505, a second overlay snap of the volume is generated. In one embodiment, the first overlay snap is generated by the target side. At block 506, a second data stream is written to the second overlay snap.

After the initial data sweep is completed, the target volume contains the initial data stream. In one embodiment, a copy of the snapshot is generated on the target volume, and the initial data stream is therefore consistent. This volume will not change now as the initial data stream is complete. The overlay snap contains data that arrived during the initial sweep and any new data that is still arriving to the overlay snap. Accordingly, in response to the completion of copying the data to the target side, this data with the overlay snap may be considered the current status of the volume. It is therefore possible to provide the continuous data replication system with a copy of the disk (e.g., at block 502), a current version of the disk (e.g., the disk attached to the overlay snap), and the old version of the disk. In this way, particularly by reading the data from the snapshot from the source side (e.g., primary storage), using a copy of the snapshot, and using the overlay snap including the changes (e.g., new data), the snapshot may be separated from the changes to the volume on the storage side and synchronization mechanisms are not required to determine the order of receipt of the data stream (e.g., which data stream came first) or the correct data has been read.

In one embodiment, the overlay snap is promoted, which results in all data written to the overlay snap to be written to the underlying volume. In one embodiment, this is an atomic operation implemented by doing pointer manipulation to achieve the effect from the end user perspective, rather than actually copying the data. New data streams can then be sent directly to the volume, since the storage system is now consistent.

If situations where the initial sweep is interrupted for any reason and needs to restart, the overlay snap may be promoted, a new overlay snap created and process 500 may be performed again.

In one embodiment, multiple overlay snaps may be created to support multiple incoming data streams, particularly if their initial ordering is clear. In one embodiment, any incoming new data streams target a single overlay snap (e.g., the top overlay snap) in order to be cross consistent. In one embodiment, an overlay snapshot is generated on the target storage and a new data stream is written to the overlay snap. Additional overlay snapshots may be generated for any additional incoming data streams. A snapshot of a volume is generated at the source storage and the snapshot is transmitted to the target storage so that the target storage generates a copy of the snapshot. In response to completion of the snapshot being transmitted to the target storage, the overlay snapshots are attached to the volume such that a current point in time snapshot of the volume may be generated.

In one embodiment, a point in time of the volume may be generated on the target storage periodically (e.g., every 10 minutes). For example, a new overlay snap may be periodically generated during the initialization process, and the overlay snaps may be layered and attached to the volume to obtain a current point in time snapshot of the volume.

Figure 6:
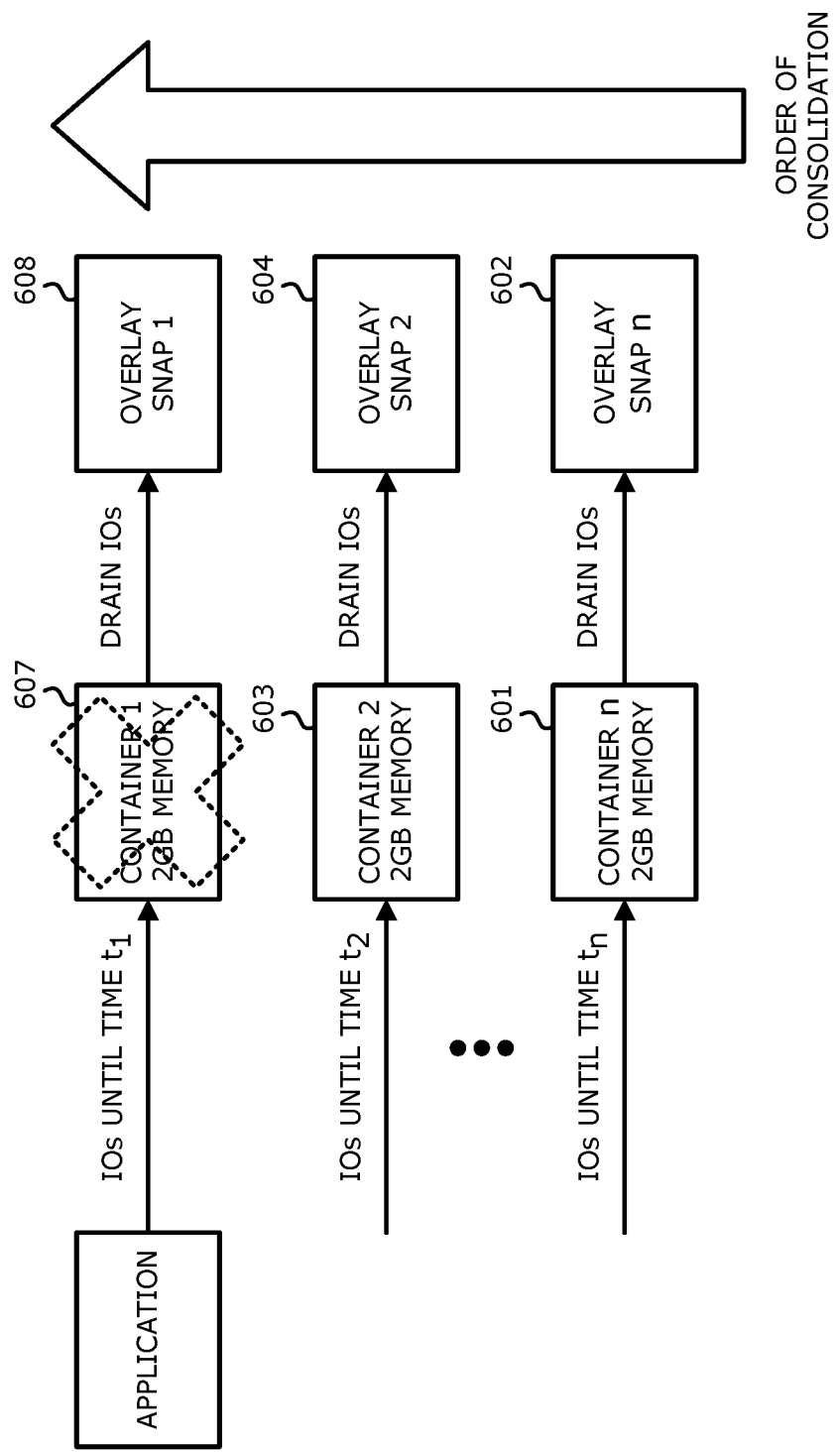
FIG. 6 is a block diagram for explaining dynamic memory buffering using containers and overlay snaps according to an embodiment herein.

FIG. 6 is a block diagram for explaining dynamic memory allocation using containers and overlay snaps.

In PaaS platforms, container technologies are often used to deploy application components to production. In this regard, application components may run in a container on a physical or virtual machine providing hardware virtualization. A container emulates an operating system environment. Containers allow developers to have "dev/prod parity", such that the software components deployed in production act the same as they do during development. One example implementation of containers is provided by the Docker project. The project provides a container engine that can instantiate containers on a machine and take down containers that are no longer needed.

One approach to implementing continuous replication, especially in situations where a small amount of memory is available, is to generate containers that will each accept all the data streams. However, each of the containers will have a limited amount of memory. In addition, there may be situations where incoming data streams are being received faster than the outgoing data streams are being output. The embodiment of FIG. 6 addresses such storage issues by using containers together with overlay snaps.

In the embodiment of FIG. 6, each container (e.g., 601, 603, 607) writes to an overlay snap (e.g., 602, 604, 608, respectively). In the example of FIG. 6, each container is shown to have 2 GB of memory. However, this is merely one example and a container may be of any size. When a container is generated, it receives a data stream, and when the memory of the container is full another container is generated to receive a new data stream. Each container writes to a different overlay snap on the target storage. Thus, container 601 writes to overlay snap 602, container 603 writes to overlay snap 604, and container 607 writes to overlay snap 608. When a container is done writing its data to the target storage, it is removed. There is therefore no need to orchestrate ordering between the containers, since each container writes to a different overlay snap. Since the first snapshot is the one with the lowest rights to appear in the volume, the target storage may merge the overlay snaps in the correct order.

In one embodiment, one container may be transmitting data to an overlay faster than another container, so the newer snapshot may be ready before the older one. In this case, the system may wait until the older snapshot is ready (e.g., transmission of the data has completed) and apply the snapshots one after another. Thus, using containers together with overlay snaps allows a dynamic way to manage memory use.

In one embodiment, containers are dynamically allocated to be used as memory buffers (caches). The containers are generated in a specific order where, in response to the storage of a first container being filled by receiving a data stream, traffic is redirected to a second container. In one embodiment, the data stream is directed to the first container until the storage capacity of the first container has been reached (e.g., the first container is full). In one embodiment, the data stream is directed to the first container until the first container is partially full (e.g., the storage capacity of the first container has not been reached). In one embodiment, sufficient scale for any replication load may be provided by cloud scale-out properties.

Each container will be drained by matching it with a specific overlay snap generated in association with that particular container. In the embodiment of FIG. 6, container 607 is associated with overlay snap 608 and data from container 607 is written to overlay snap 608, container 603 is associated with overlay snap 604 and data from container 603 is written to overlay snap 604, and container 601 is associated with overlay snap 602 and data from container 601 is written to overlay snap 602. Therefore, an order of the overlay snaps may be determined by the order of the containers (e.g., the order of the containers implicitly dictates an order of the overlay snaps.)

All of the data from a container is transmitted to its associated overlay snap. In response to the data being sent and acknowledged, the container may be destroyed and memory freed for other uses.

In one embodiment, the order of generation of the containers and the order of applying the associated overlay snaps to the volume is the same. In one embodiment, on the target storage side, the overlay snaps may be collapsed/promoted to the underlying volume in the order of consolidation (e.g., the order determined by the order of the containers). In one embodiment, the order of applying the containers to the overlay snaps and the order of applying the associated overlay snaps to the volume is the same. Promotion order typically guarantees write order fidelity. Use of the associated overlay snaps ensure that write order may be determined when IOs are received.

It is important to note that a new container may be generated in response to memory being exhausted or at every constant point in time, for example every 10 minutes. The same method can be used also without containers by generating an new overlay snap (e.g., every 10 minutes) and thus allowing recovery to point in time every 10 minutes even if the volumes were originally out of sync.

In addition, the list of the overlay snaps along with the initial volume allows for multiple point in time recoveries, e.g., recovery of the volume at each 10 minute interval.

The foregoing arrangement results in a completely flexible scale out cache. Containers use up RAM to expand the cache, and the containers are removed once all their data has been transferred. Containers are created in order so all data streams (e.g., IOs) are consistent within each container. The overlay snaps ensure that data from each container keeps write order fidelity and the overlay snap promote order ensures write order fidelity between the containers.

In one embodiment, the overlay snap and continuous transfer are created before the snapshot of the primary (source) volume is taken or before reading of the initial stream.

In one embodiment, any data stream that is directed to a specific container needs to be completed (e.g., the data of the container should be flushed) before the overlay snap may be applied to an underlying volume. In one embodiment, if the data stream includes any errors, the errors are resolved before the overlay snap is applied to the volume. In one embodiment, when switching between containers, generation of the second container may be initiated when the storage capacity of the first container has reached a threshold, such as a percentage (e.g., 95% full). Therefore, the containers may be operating in parallel for an amount of time. The threshold may be selected or determined by the system to allow for the second container to be generated before the storage capacity of the first container becomes full. In one embodiment, in response to switching to the second container, the data stream from the first container may be transmitted. In one embodiment, in response to switching to the second container, the system may also start sending out the data streams (IOs) with the associated overlay snaps while maintaining write order fidelity.

It is therefore possible to provide a system having an infinitely extending buffer by generating containers and overlay snaps. It is also possible to receive data streams quickly without interruption.

Figure 7:
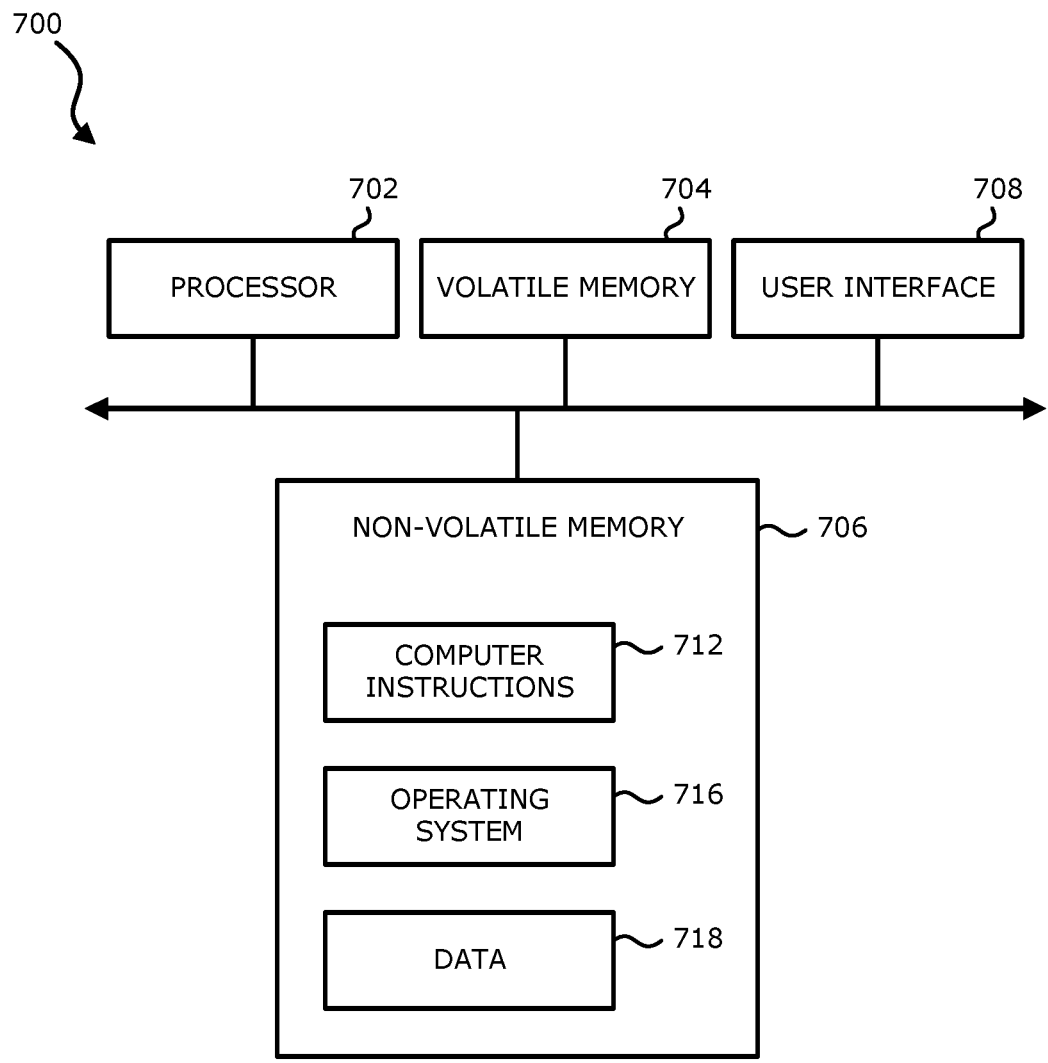
FIG. 7 is a block diagram for explaining a data processing system according to an embodiment.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., process 500).

Processor 702 may represent a single processor or multiple processors with a single processor core or multiple processor cores included therein. Processor 702 may represent one or more general-purpose processors such as a microprocessor, a central processing unit (CPU), or the like. More particularly, processor 702 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 702 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 702, which may be a low power multi-core processor socket such as an ultra-low voltage processor, may act as a main processing unit and central hub for communication with the various components of the system. Such processor can be implemented as a system on chip (SoC). Processor 702 is configured to execute instructions for performing the operations and steps discussed herein. System 600 may further include a graphics interface that communicates with optional graphics subsystem, which may include a display controller, a graphics processor, and/or a display device.

Processor 702 may communicate with memory 706, which in one embodiment can be implemented via multiple memory devices to provide for a given amount of system memory. Memory 706 may include one or more volatile storage (or memory) devices such as random access memory (RAM), dynamic RAM (DRAM), synchronous DRAM (SDRAM), static RAM (SRAM), or other types of storage devices. Memory 706 may store information including sequences of instructions that are executed by processor 702, or any other device. For example, executable code and/or data of a variety of operating systems, device drivers, firmware (e.g., input output basic system or BIOS), and/or applications can be loaded in memory 706 and executed by processor 702. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

The processes described herein (e.g., process 500) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 500 is not limited to the specific processing order of FIG. 5. Rather, any of the processing blocks may be re-ordered, combined or removed, performed in parallel or in serial, as necessary, to achieve the results set forth above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Thus, as described herein, in one embodiment, a first overlay snap is generated, a first data stream is written to the first overlay snap, first pointers are generated indicating locations of new data written to the overlay snap, first null pointers are generated for locations that do not have new data written to the overlay snap, where the first overlay snap comprises the first pointers and the first null pointers. In one embodiment, the first null pointers comprise pointers pointing to nowhere. In one embodiment, the first overlay snap is attached to a storage volume to generate a new storage volume. In one embodiment, the first overlay snap is attached to a storage volume to generate a first snapshot, where the first snapshot records information of a block device or a file system at a first point in time. In one embodiment, a second overlay snap is generated by generating a second snapshot of the logical storage volume, wherein the second snapshot records information of a block device or a file system at a second point in time, a second data stream is written to the second overlay snap, second pointers are generated indicating locations of new data written to the second overlay snap, and second null pointers are generated for locations that do not have new data written to the second overlay snap, where the second overlay snap comprises the second pointers and the second null pointers, where the second data stream is written to the second overlay snap in parallel to the first data stream being written to the first overlay snap. In one embodiment, the first overlay snap and the second overlay snap are included in a list, and the list is attached to a storage volume to generate a new storage volume. In one embodiment, the first overlay snap and the second overlay snap are included in a list, and the list is attached to a storage volume to generate a snapshot from the list, wherein the snapshot records information of a block device or a file system at a point in time. In one embodiment, the overlay snap is generated by generating a snapshot of an empty volume.

Also, in one embodiment, continuous data replication of a source volume on a source storage device includes generating a first overlay snap of a replica volume on a target storage device, writing a first data stream from the source storage device to the first overlay snap, receiving an initial data stream from the source storage device, and writing the initial data stream to the replica volume on the target storage device. In one embodiment, in response to completion of the initial data stream being written to the replica volume on the target storage device, the first overlay snap is attached to the replica volume on the target storage device. In one embodiment, a second overlay snap of the replica volume is generated on the target storage device, and a second data stream from the source storage device is written to the second overlay snap. In one embodiment, in response to completion of the initial data stream being written to the replica volume on the target storage device, the second overlay snap is attached to the replica volume. In one embodiment, a new overlay snap of the replica volume is periodically generated on the target storage device, and a new data stream is written to the new overlay snap. In one embodiment, in response to completion of the initial data stream being written to the replica volume on the target storage device, each new overlay snap is attached to the replica volume to generate a new volume, each new volume recording information of a block device or a file system at a new point in time, and storing as an archive each of new volumes. In one embodiment, the initial data stream is read directly from the source storage device. In one embodiment, the initial data stream comprises a snapshot of the source volume of the source storage device. In one embodiment, the first overlay snap is generated by generating a first snapshot of a logical storage volume, writing the data stream to the first overlay snap, generating first pointers indicating locations of new data written to the first overlay snap, and generating first null pointers for locations that do not have new data written to the first overlay snap, wherein the first overlay snap comprises the first pointers and the first null pointers.

What is claimed is:

1. A computer-implemented method, comprising:
receiving a number of data streams, including a first data stream received between an initial time to a first time and a second data stream received between the first time and a second time;
generating a first container to receive the first data stream, wherein the first container has a first storage capacity;
generating a first overlay snap associated with the first container by generating an initial snapshot of logical storage volume, and transmitting data of the first container to the first overlay snap;
in response to the first storage capacity reaching a threshold, generating a second container to receive the second data stream, wherein the second container has a second storage capacity; and
generating a second overlay snap associated with the second container by generating a second initial snapshot of a second logical storage volume, and transmitting data of the second container to the second overlay snap.

2. The computer-implemented method of claim 1 wherein the first overlay snap is further generated by writing the first data stream to the first overlay snap, generating first pointers indicating locations of new data written to the first overlay snap, and generating first null pointers for locations that do not have new data written to the first overlay snap, wherein the first overlay snap comprises the first pointers and the first null pointers, and wherein the second overlay snap is further generated by writing the second data stream to the second overlay snap, generating second pointers indicating locations of new data written to the second overlay snap, and generating second null pointers for locations that do not have new data written to the second overlay snap, wherein the second overlay snap comprises the second pointers and the second null pointers.

3. The computer-implemented method of claim 1 wherein the threshold is selected to allow for the second container to be generated before the first storage capacity of the first container becomes full.

4. The computer-implemented method of claim 1, the method further comprising:
attaching the first overlay snap to a storage volume to generate a first snapshot, wherein the first snapshot records information of a storage volume at a first point in time; and
after attaching the first overlay snap, attaching the second overlay snap to the storage volume to generate a second snapshot, wherein the second snapshot records information of the storage volume at a second point in time.

5. The computer-implemented method of claim 1, wherein the first overlay snap and the second overlay snap are applied to a storage volume in an order determined by an order of the first and second containers being generated.

6. The computer-implemented method of claim 5, wherein the first overlay snap is applied to the storage volume in response to completion of the data of the first container being transmitted to the first overlay snap.

7. The computer-implemented method of claim 6, wherein completion of data of the first container being transmitted to the first overlay snap includes resolving any errors in the data.

8. An apparatus comprising:
electronic hardware circuitry, including a processor and memory configured to:
receive a number of data streams, including a first data stream received between an initial time to a first time and a second data stream received between the first time and a second time;
generate a first container to receive the first data stream, wherein the first container has a first storage capacity;
generate a first overlay snap associated with the first container by generating an initial snapshot of a logical storage volume, and transmit data of the first container to the first overlay snap;
in response to the first storage capacity reaching a threshold, generate a second container to receive the second data stream, wherein the second container has a second storage capacity; and
generate a second overlay snap associated with the second container by generating a second initial snapshot of a second logical storage volume, and transmit data of the second container to the second overlay snap.

9. The apparatus of claim 8 wherein the first overlay snap is further generated by writing the first data stream to the first overlay snap, generating first pointers indicating locations of new data written to the first overlay snap, and generating first null pointers for locations that do not have new data written to the first overlay snap, wherein the first overlay snap comprises the first pointers and the first null pointers, and wherein the second overlay snap is further generated by writing the second data stream to the second overlay snap, generating second pointers indicating locations of new data written to the second overlay snap, and generating second null pointers for locations that do not have new data written to the second overlay snap, wherein the second overlay snap comprises the second pointers and the second null pointers.

10. The apparatus of claim 8 wherein the threshold is selected to allow for the second container to be generated before the first storage capacity of the first container becomes full.

11. The apparatus of claim 8, the electronic hardware circuitry further configured to:
attach the first overlay snap to a storage volume to generate a first snapshot, wherein the first snapshot records information of a storage volume at a first point in time; and
after attaching the first overlay snap, attach the second overlay snap to the storage volume to generate a second snapshot, wherein the second snapshot records information of the storage volume at a second point in time.

12. The apparatus of claim 8 wherein the first overlay snap and the second overlay snap are applied to a storage volume in an order determined by an order of the first and second containers being generated.

13. The apparatus of claim 12 wherein the first overlay snap is applied to the storage volume in response to completion of the data of the first container being transmitted to the first overlay snap.

14. The apparatus of claim 13 wherein completion of data of the first container being transmitted to the first overlay snap includes resolving any errors in the data.

15. An article comprising:
a non-transitory computer-readable medium that stores computer-executable instructions, the instructions causing a machine to:
receive a number of data streams, including a first data stream received between an initial time to a first time and a second data stream received between the first time and a second time;
generate a first container to receive the first data stream, wherein the first container has a first storage capacity;
generate a first overlay snap associated with the first container by generating an initial snapshot of a logical storage volume, and transmit data of the first container to the first overlay snap;
in response to the first storage capacity reaching a threshold, generate a second container to receive the second data stream, wherein the second container has a second storage capacity; and
generate a second overlay snap associated with the second container by generating a second initial snapshot of a second logical storage volume, and transmit data of the second container to the second overlay snap.

16. The article of claim 15 wherein the first overlay snap is further generated by writing the first data stream to the first overlay snap, generating first pointers indicating locations of new data written to the first overlay snap, and generating first null pointers for locations that do not have new data written to the first overlay snap, wherein the first overlay snap comprises the first pointers and the first null pointers, and wherein the second overlay snap is further generated by writing the second data stream to the second overlay snap, generating second pointers indicating locations of new data written to the second overlay snap, and generating second null pointers for locations that do not have new data written to the second overlay snap, wherein the second overlay snap comprises the second pointers and the second null pointers.

17. The article of claim 15 wherein the threshold is selected to allow for the second container to be generated before the first storage capacity of the first container becomes full.

18. The article of claim 15, the instructions further causing the machine to:
attach the first overlay snap to a storage volume to generate a first snapshot, wherein the first snapshot records information of a storage volume at a first point in time; and
after attaching the first overlay snap, attach the second overlay snap to the storage volume to generate a second snapshot, wherein the second snapshot records information of the storage volume at a second point in time.

19. The article of claim 15 wherein the first overlay snap and the second overlay snap are applied to a storage volume in an order determined by an order of the first and second containers being generated.

20. The article of claim 19 wherein the first overlay snap is applied to the storage volume in response to completion of the data of the first container being transmitted to the first overlay snap.

21. The article of claim 20 wherein completion of data of the first container being transmitted to the first overlay snap includes resolving any errors in the data.

* * * * *